Aug. 20, 1963 R. D. McKENZIE 3,101,094
HIGH TEMPERATURE VALVE
Filed Dec. 11, 1961
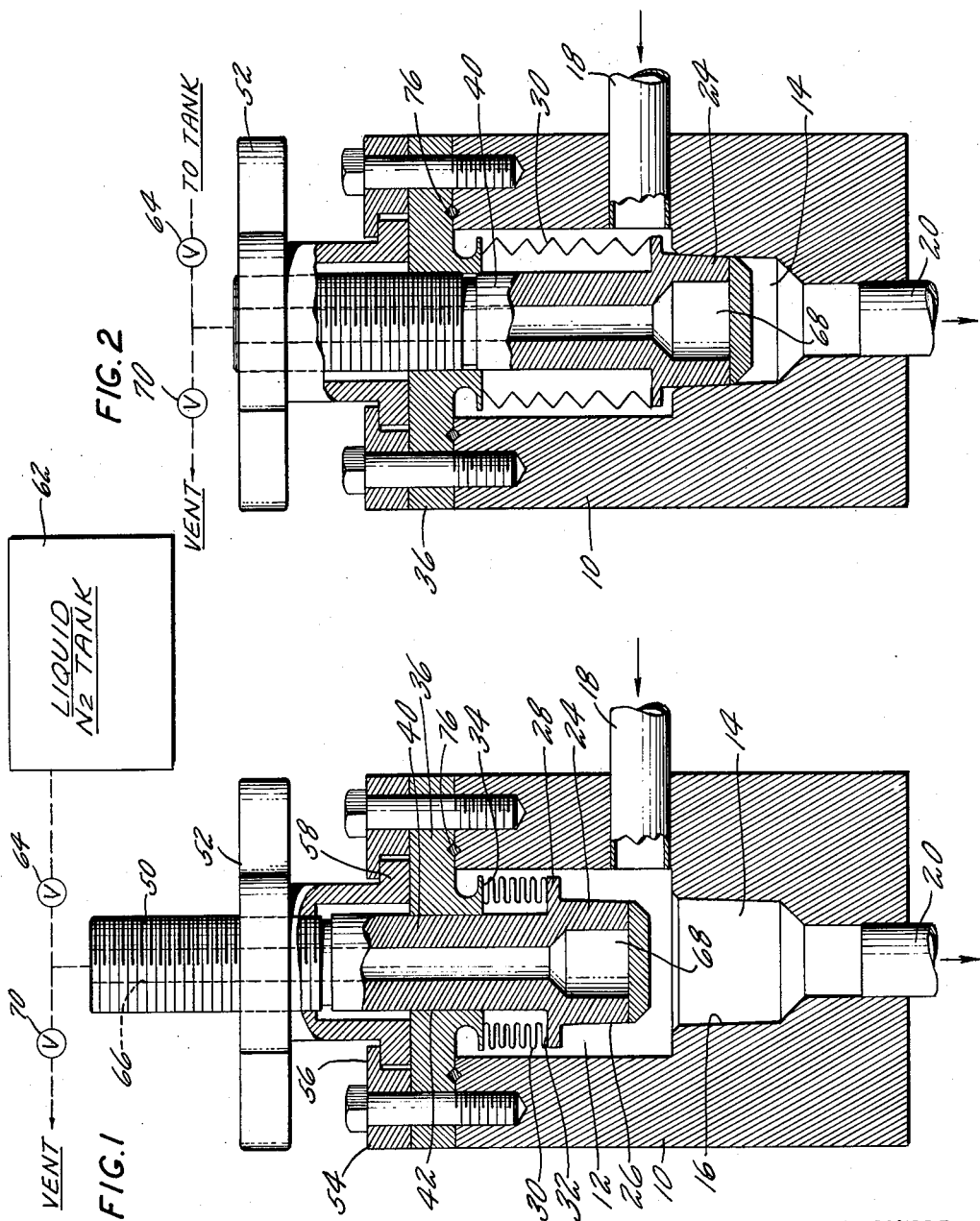
INVENTOR
ROBERT D. McKENZIE
BY Leonard F. Wellard
ATTORNEY 3,101,094
HIGH TEMPERATURE VALVE
Robert D. McKenzie, East Hartford, Conn., assignor to United Aircraft Corporation, East Hartford, Conn., a corporation of Delaware
Filed Dec. 11, 1961, Ser. No. 158,397
1 Claim. (Cl. 137—340)

This invention relates to an improved valve structure and more particularly to fluid-tight valving for high vacuum for extreme temperatures.

In fluid systems wherein high vacuums are involved, the fluid-tight sealing of valving in the system is critical. When operating with vacuums in the order of $10^{-5}$ to $10^{-9}$ mm. Hg, or lower, it is necessary to elevate the temperature of the parts involved so as to drive off any gas molecules which may have been absorbed on the metal surfaces exposed to the vacuum. Therefore, it is necessary to provide valves in the system which can operate through a number of sequences and which can provide fluid-tight sealing at elevated temperatures as well as at room temperature.

It is therefore an object of this invention to provide a valve comprising a metal seat and piston which cooperate to provide the fluid-tight seal by virtue of an interference fit between the two. In spite of this interference fit this valve is so arranged that it is capable of repeated operation without appreciable wear or distortion.

These and other objects of this invention will become readily apparent from the following detailed description of the drawing, in which:

FIG. 1 is a detailed cross section of the valve in its open position; and

FIG. 2 is a sectional view of the valve in its closed position.

Referring to FIG. 1, a valve body 10 includes an inner chamber 12 and a machined bore 14. The sidewall of the bore 14 is slightly tapered. The body 10 includes an inlet 18 and an outlet 20. A reciprocable valve piston element 24 is located within the chamber 12. The sidewalls 26 of the piston 24 also include a slight taper which substantially conforms to the taper of the wall 16 in the bore 14. The valve piston 24 includes an annular flange 28, to which is brazed a metal bellows 30. The brazing or other suitable sealing connection is made at 32 to connect the lower end of the bellows 30 and the upper surface of the flange 28. The upper end of the bellows 30 is suitably connected at 34 to a cap or bushing member 36.

The stem 40 of the valve piston 24 has a substantially close fit as at 42 with the bushing 36. The bellows connection between member 36 and seal 34 is such that the valve piston 24 is able to move vertically, but will not rotate about its longitudinal axis. The valve stem 40 includes a threaded portion 50 which is engaged by a nut 52. An annular cap 54 is bolted to the body 10 and includes a lip 56 engaging the flange 58, forming the lower portion of the nut 52. It will be noted that rotation of the nut 52 will cause the valve stem 40 and piston 24 to move vertically.

The valve piston 24 is preferably made of a relatively soft metal having a high coefficient of expansion, e.g. copper. The valve body and particularly the seat as defined by the bore 14 is preferably of a hard metal such as steel which, as compared to copper, has a lower thermal conductivity and lower coefficient of expansion.

In order to operate the valve, a cryogenic fluid, as for example, liquid nitrogen, is supplied from a source 62 whereby it flows through valve 64, and to the passage 66 which leads to the chamber 68 in the hollow portion of the valve piston 24. The cryogenic fluid (liquid nitrogen) will shrink the valve piston sufficiently so that it can be moved to the position shown in FIG. 2 by means of rotation of the nut in FIG. 2. In this position the piston 24 fits snugly into the bore 14 and because of the taper of the sidewalls of the piston and the bore, a close fit will be obtained. After the valve is moved to this closed position the valve 64 is closed and valve 70 opened to vent the nitrogen from the chamber 68. As a result, the valve piston 24 will reach the ambient temperature, expanding at a greater rate than the surrounding steel body such that an interference fit, resulting in an extremely firm, fluid-tight seal is provided, thereby preventing the flow of any fluid between the conduits 18 and 20. In this position the bellows 30 will prevent any flow of fluid up past the valve stem 40 and the soft metal ring seal 76 between the body 10 and the bushing 36 prevents any fluid escape past the engaging surfaces in the last mentioned parts.

In the closed position, the valve can be exposed to wide ranges of temperature change without losing any of its sealing capacity. The differing coefficients of expansion of the metals of the piston and seat contribute to the seating and unseating of the valve. During the opening operation, the valve piston will be freed from the seat rapidly, allowing the piston to be withdrawn with no actual sliding contact with the seat walls, thus eliminating wear.

As mentioned above, in order to insure the high vacuum desired, it is necessary to "bake" the various parts or, in other words, raise their temperature to insure that the gases absorbed in the metal surfaces are driven off. This "baking" insures that the gas molecules are not later freed to contaminate the vacuum system. Although the valve may withstand "baking" while open or closed, it normally would be exposed to high temperature in its open position during the pumping down of the system.

In order to open the valve, the vent valve 70 is closed while the supply valve 64 is opened to again fill the chamber 68 with liquid nitrogen. This lowers the temperature of piston 24 and causes it to shrink slightly. By turning the nut 52, the piston 24 can be withdrawn from the bore 14 with ease and without any damage to the engaging parts. It is important to note that since the copper piston of the valve is soft, it readily conforms to the surface of the bore when its temperature is elevated following the release of the nitrogen from the chamber 68. As a result the valve can be used repeatedly and is not subject to wearing or galling, or the deterioration commonly existing in high temperature valves utilizing ordinary seating devices.

As a result of this invention it will be apparent that a very simple valve structure has been provided which is reliable under extreme vacuum conditions.

Although only one embodiment of this invention has been illustrated and described, it will be apparent that various changes and modifications may be made in the arrangement of the various parts without departing from the scope of this novel concept.

I claim:

A valve adapted to provide a fluid-tight seal at elevated temperatures and under high vacuum conditions comprising a body, a tapered bore in said body forming a relatively hard metal valve seat having a hardness of the order of steel, a movable valve element of frustoconical shape engageable with said seat and having a tapered sidewall portion shaped to generally conform to said seat, a fluid tight bellows connecting said body and element, said valve element being formed of a relatively soft metal having a hardness of the order of copper, said latter metal having a higher coefficient of expansion and a higher thermal conductivity than the metal valve seat, a chamber in said valve element including a passage connected thereto, a source of cryogenic fluid, means for conducting said fluid to said passage and said chamber to shrink said element at a rate relatively greater than the adjacent seat, means for moving said valve element into engagement with said seat, means for venting said passage and chamber whereby after engagement with said seat the said valve element expands at the operating temperature of the valve to form an interference fit with said seat and the soft metal wall of said element readily conforms to the contour of said seat.

References Cited in the file of this patent

UNITED STATES PATENTS

| | | |
|---|---|---|
| 685,748 | Davis | Nov. 5, 1901 |
| 2,114,139 | Crosthwait | Apr. 12, 1938 |
| 2,132,262 | Gabriel | Oct. 4, 1938 |
| 2,919,710 | Lantz | Jan. 5, 1960 |
| 2,994,338 | Wilson | Aug. 1, 1961 |
| 3,028,874 | Burkett | Apr. 10, 1962 |

OTHER REFERENCES

Tool Engineering, Feb. 1958 (A.S.T.E. Chicago), pages 107–115. Page 112 relied on.